(12) United States Patent
Mizuno et al.

(10) Patent No.: US 8,573,085 B2
(45) Date of Patent: Nov. 5, 2013

(54) POWER UNIT FOR VEHICLE

(75) Inventors: Kinya Mizuno, Saitama (JP); Yoshiaki Tsukada, Saitama (JP); Masaya Murao, Saitama (JP); Yasushi Fujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 13/233,333

(22) Filed: Sep. 15, 2011

(65) Prior Publication Data

US 2012/0067146 A1    Mar. 22, 2012

(30) Foreign Application Priority Data

Sep. 21, 2010  (JP) ................................. 2010-210498

(51) Int. Cl.
    *F16H 3/08*      (2006.01)
(52) U.S. Cl.
    USPC ............................................. 74/331; 74/330
(58) Field of Classification Search
    USPC .................................. 74/330, 331, 333, 340
    See application file for complete search history.

(56) References Cited

U.S. PATENT DOCUMENTS

| 5,390,560 | A  | * | 2/1995  | Ordo ................................ 74/329 |
| 5,542,309 | A  | * | 8/1996  | Wenger et al. ............... 74/337.5 |
| 6,494,110 | B2 | * | 12/2002 | Hatakeyama .................... 74/331 |
| 7,631,570 | B2 | * | 12/2009 | Mizuno et al. .................. 74/331 |

FOREIGN PATENT DOCUMENTS

JP    2008-303939 A    12/2008

* cited by examiner

*Primary Examiner* — Ha D Ho
(74) *Attorney, Agent, or Firm* — Carrier Blackman & Associates, P.C.; William D. Blackman; Joseph P. Carrier (57) ABSTRACT

A power unit for a vehicle includes first and second clutches, that transmit/interrupt rotary power from a primary reduction gear mechanism to first and second main shafts, arranged at respective ends of the first and second main shafts with selectively established multispeed gears provided among a countershaft, and the first and second main shafts. The primary reduction gear mechanism includes: a single driving gear provided on a crankshaft; a first driven gear supported by a first main shaft for relative rotation therewith at a position adjacent to the first clutch and meshes with the driving gear; an intermediate driving gear rotating with the first driven gear; an idle gear that meshes with the intermediate driving gear, and supported by the countershaft for relative rotation therewith; and a second driven gear, that meshes with the idle gear, and supported by the second main shaft for relative rotation therewith.

20 Claims, 6 Drawing Sheets

FIG. 6 under 35 USC 119
POWER UNIT FOR VEHICLE

CROSS-REFERENCE TO RELATED APPLICATIONS

The present invention claims priority under 35 USC 119 based on Japanese patent application No. 2010-210498, filed on Sep. 21, 2010. The entire subject matter of this priority document, including specification claims and drawings thereof, is incorporated by reference herein.

BACKGROUND OF THE INVENTION

1. Field of the Invention

The present invention relates to a power unit for a vehicle. More particularly, the present invention relates to a power unit for a vehicle, in which a crankshaft, first and second main shafts and a single countershaft are rotatably supported by a crankcase with their axes being parallel to each other, multispeed gears to be selectively established are provided among the first main shaft, second main shaft and countershaft, a single driving gear that makes up a part of a primary reduction gear mechanism for transmitting rotary power from the crankshaft to the first and second main shafts is mounted on the crankshaft, and first and second clutches that transmit/interrupt the rotary power from the primary reduction gear mechanism to the first and second main shafts are disposed at ends of the first and second main shafts, respectively.

2. Description of the Background Art

There is a known power unit for a vehicle. An example of such power unit is disclosed in the JP-A No. 2008-303939, in which selectively established multispeed gears are provided among a pair of main shafts disposed parallel to each other and a countershaft having an axis parallel to the main shafts, and a pair of clutches that transmit/interrupt rotary power from a crankshaft to the pair of main shafts are disposed at ends of both the main shafts, respectively.

However, the power unit disclosed in the JP-A No. 2008-303939 is configured so that a driving gear, which is provided on the crankshaft coaxially disposed with the countershaft, meshes with a driven gear, which is coaxially and rotatably supported by the first and second main shafts. In other words, in the power unit as disclosed in the JP-A No. 2008-303939, the center distance between the first and second main shafts is determined by a diameter of the driving gear. Thus, the power unit including a high-speed-rotation engine, as mounted in a motorcycle, needs an appropriate primary reduction gear ratio. However, the dimensional limitation of the driving gear and structural complexity derived from an additional shaft for supporting additional reduction gears result in a large sized power unit.

The present invention has been made to overcome the above discussed drawbacks of the existing power unit. Accordingly it is an object of the present invention to provide a power unit for a vehicle, which is capable of transmitting rotary power from a crankshaft to a pair of main shafts with fewer components and a simple structure without upsizing.

SUMMARY OF THE INVENTION

In order to achieve the above objects, the present invention according to a first feature thereof provides a power unit including: a crankshaft, first and second main shafts and a single countershaft that are rotatably supported by a crankcase with their axes being parallel to each other; multispeed gears that are selectively established and provided among the first main shaft, second main shaft and countershaft; a single driving gear that makes up a part of a primary reduction gear mechanism for transmitting rotary power from the crankshaft to the first and second main shafts and is provided on the crankshaft; and first and second clutches that transmit/interrupt the rotary power from the primary reduction gear mechanism to the first and second main shafts and are disposed at ends of the first and second main shafts, respectively, wherein the primary reduction gear mechanism includes: the driving gear; a first driven gear that is supported by the first main shaft for relative rotation therewith at a position adjacent to the first clutch and that is meshed with the driving gear; an intermediate driving gear rotating with the first driven gear; an idle gear that is meshed with the intermediate driving gear and that is supported by the countershaft for relative rotation therewith; and a second driven gear that is supported by the second main shaft for relative rotation therewith and that is meshed with the idle gear, the first clutch is provided between the first driven gear and first main shaft, and the second clutch is provided between the second driven gear and second main shaft.

The present invention according to a second feature thereof, in addition to the first feature, is characterized in that the first driven gear and intermediate driving gear are integrally formed as a one-piece structure.

The present invention according to a third feature thereof, in addition to one of the first and second features, is characterized in that the first driven gear is disposed so as to overlap with a part of the idle gear as viewed in the axial direction of the first main shaft.

The present invention according to a fourth feature thereof, in addition to one of the first through third features, is characterized that the first driven gear is disposed so as to overlap with a part of the second clutch as viewed along a line connecting the axes of the first and second main shafts.

The present invention according to a fifth feature thereof, in addition to one of the first through fourth features, is characterized that the first and second clutches are disposed at ends of the first and second main shafts so that at least parts of the first and second clutches overlap with each other as viewed along a line connecting the axle of the first and second main shafts, and the idle gear is disposed so as to overlap with a part of the first and second clutches as viewed along the axis of the countershaft.

The present invention according to a sixth feature thereof, in addition to one of the first through fifth features, is characterized that the countershaft is rotatably supported by the crankcase with one end of the countershaft positioned axially more inward than the ends of the first and second main shafts, and the first driven gear is disposed between the idle gear mounted on the end of the countershaft and first and second clutches.

The present invention according to a seventh feature thereof, in addition to one of the first through sixth features, further comprises a first elastic member interposed between the first driven gear and an input member of the first clutch.

The present invention according to an eighth feature thereof, in addition to the seventh feature, further comprises a second elastic member, which is different from the first elastic member. The second elastic member is interposed between the second driven gear and an input member of the second clutch.

The present invention according to a ninth feature thereof, in addition to one of the first through eighth features, is characterized that the first main shaft, second main shaft and a shift drum are arranged so that the center distance between the first main shaft and shift drum becomes equal to the center distance between the second main shaft and shift drum.

The present invention according to a tenth feature thereof, in addition to one of the first through ninth features, is characterized that the first main shaft, second main shaft and countershaft are arranged so that a line connecting the axes of the first main shaft, second main shaft and countershaft inclines downwardly and rearwardly on a projection view of a plane orthogonal to the axes of the first main shaft, second main shaft and countershaft, and the shift drum is arranged lower than the line and more forward than the second main shaft.

It may be noted that first clutch outers 51, 88 in the illustrative embodiments correspond to the input member of the first clutch in the present invention, damping rubbers 77, 112 in the embodiments correspond to the elastic members in the present invention, and a second clutch outer 101 in the embodiments correspond to the input member of the second clutch in the present invention.

Advantageous Effects Of Present Invention

According to the first feature of the present invention, the rotary power from the crankshaft can be transmitted smoothly toward the first and second main shafts by rotating the first driven gear and intermediate driving gear with the rotation of the driving gear mounted on the crankshaft to transmit the rotary power of the intermediate driving gear to the second driven gear via the idle gear. In addition, supporting the idle gear by the countershaft so as to rotate relative to the countershaft eliminates the necessity of an additional shaft for the idle gear, and in turn an increase in the number of components and the necessity of a space for the additional shaft are eliminated, thereby preventing the power unit from upsizing.

According to the second feature of the present invention, integrally forming the intermediate driving gear with the first driven gear as one-piece structure can reduce the number of components of the power unit.

According to the third feature of the present invention, the first driven gear overlaps with a part of the idle gear as viewed in the axial direction of the first main shaft. This makes the diameter of the intermediate driving gear and second driven gear smaller and the relative center distance among the first main shaft, countershaft and second main shaft shorter, thereby downsizing the power unit.

According to the fourth feature of the present invention, the first driven gear overlaps with a part of the second clutch as viewed along the line connecting the axes of the first and second main shafts. This can make the shaft length of the second main shaft shorter in comparison with a case where the second clutch on the second main shaft is disposed axially more outward than the first driven gear, thereby downsizing the power unit.

According to the fifth feature of the present invention, at least a part of the first and second clutches overlap with each other as viewed along a line connecting the axes of the first and second main shafts. This can prevent the power unit from upsizing in the axial direction in comparison with a case where the first and second clutches are displaced from each other in the axial direction. In addition, arranging the idle gear so as to overlap with a part of the first and second clutches as viewed along the axis of the countershaft can make the center distance among the first main shaft, countershaft and second main shaft shorter, thereby downsizing the power unit.

According to the sixth feature of the present invention, the countershaft is disposed so that one end of the countershaft is positioned axially more inward than the ends of the first and second main shafts, and the first driven gear is disposed between the idle gear on the end of the crankshaft and the first and second clutches. This can place the first driven gear and idle gear axially near each other and in turn can make the power transmission structure from the crankshaft to first and second main shafts compact. In addition, positioning the end of the countershaft axially more inward than the ends of the first and second main shafts can effectively use the space between the idle gear and first clutch for the first driven gear, thereby downsizing the power unit.

According to the seventh feature of the present invention, the first elastic member interposed between the first driven gear and the input member of the first clutch can alleviate the shock of the rotary power on the first and second main shafts from the crankshaft, thereby reducing the number of components and alleviating the shock from the crankshaft onto the first and second main shafts.

According to the eighth feature of the present invention, the second elastic member is interposed between the second driven gear and the input member of the second clutch. In addition to the damping effect by the first elastic member between the first driven gear and the input member of the first clutch, the damping effect of the second elastic member between the second driven gear and the input member of the second clutch can more reliably absorb the shock applied on the second main shaft side.

According to the ninth feature of the present invention, the center distance between the first main shaft and shift drum is equal to the center distance between the second main shaft and the shift drum. This allows the shift fork between the shift drum and first main shaft and the shift fork between the shift drum and second main shaft to be the same in length, thereby improving the productivity.

According to the tenth feature of the present invention, the line connecting the axes of the first main shaft, second main shaft and countershaft inclines downwardly and rearwardly. This can lower the center of gravity of the engine and enables effective use of the open space in front of the second main shaft for the shift drum, thereby improving the space-use efficiency.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Illustrative embodiments of the present invention will be described with reference to the appended drawings.

Figure 1:
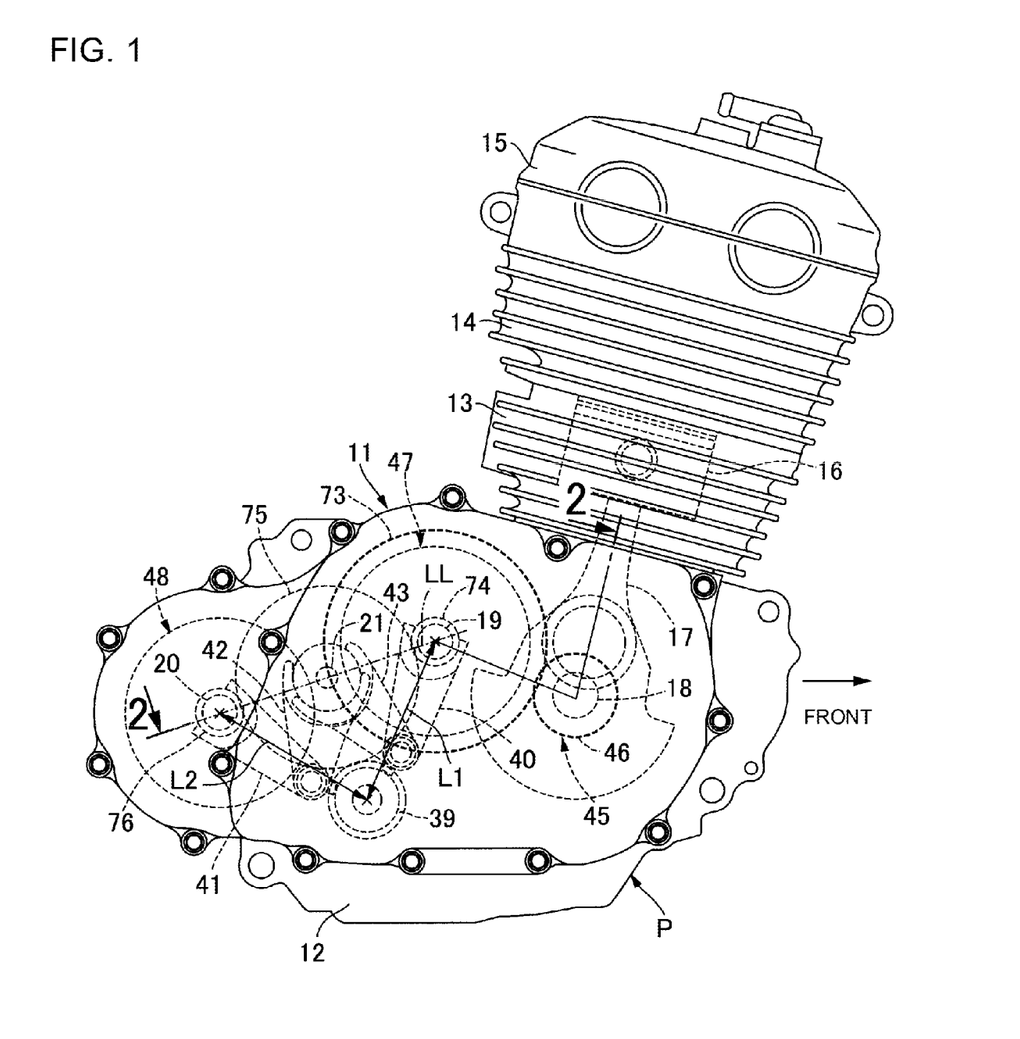
FIG. 1 is a side view of the entire power unit according to a first illustrative embodiment of the present invention.

The first embodiment of the present invention will be described with reference to FIGS. 1 and 2. First, FIG. 1 shows a power unit P mounted in a motorcycle, which is a vehicle. An engine body 11, which is a part of the power unit P, is an air-cooled single cylinder engine. The engine body 11 includes a crankcase 12, a cylinder block 13 coupled to the crankcase 12 while inclining forward so as to be raised up when mounted in the motorcycle, a cylinder head 14 coupled to an upper part of the cylinder block 13, and a head cover 15 coupled to an upper part of the cylinder head 14.

A piston 16 slidably fitting in the cylinder block 13 is connected via a connecting rod 17 with a crankshaft 18 whose axis extends in the right-left direction of the motorcycle. The crankshaft 18 is rotatably supported by the crankcase 12.

Figure 2:
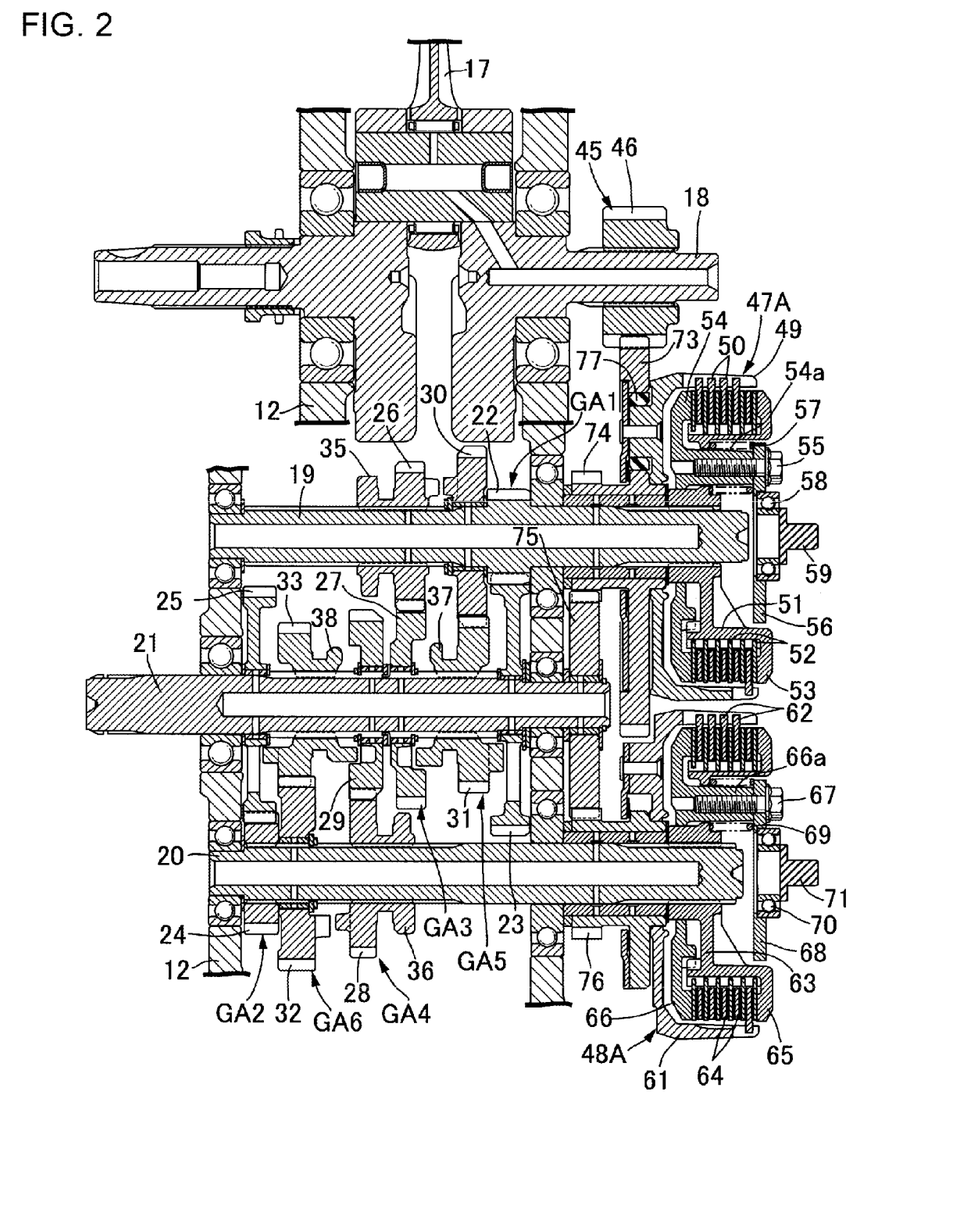
FIG. 2 is a cross-sectional view taken along lines 2-2 in FIG. 1.

Referring also to FIG. 2, in addition to the crankshaft 18, a first main shaft 19, a second main shaft 20 and a countershaft 21 are rotatably supported by the crankcase 12. The first main shaft 19, the second main shaft 20 and the countershaft 21 each have an axis, respectively, which is arranged parallel to the crankshaft 18.

Multispeed gears to be selectively established, for example, six-speed gears, are provided among the first main shaft 19, the second main shaft 20 and the countershaft 21. In the first embodiment, first, third and fifth speed gears GA1, GA3, GA5 are provided between the first main shaft 19 and the countershaft 21 and can be alternatively established. While second, fourth and sixth speed gears GA2, GA4, GA6 are provided between the second main shaft 20 and the countershaft 21 and can be alternatively established. The rotary power of the countershaft 21 is transmitted to the rear wheel of the motorcycle via a transmission device (not shown).

The first speed gear GA1 includes a first speed driving gear 22 that is integrally formed with the first main shaft 19 and a first speed driven gear 23 that is supported by the countershaft 21 for relative rotation therewith and meshes with the first speed driving gear 22. The second speed gear GA2 includes a second speed driving gear 24 that is coupled with the second main shaft 20 so as not to rotate relative thereto and a second speed driven gear 25 that is supported by the countershaft 21 for relative rotation therewith and meshes with the second speed driving gear 24.

The third speed gear GA3 includes a third speed driving gear 26 that is coupled with the first main shaft 19 so as not to rotate relative thereto and a third speed driven gear 27 that is supported by the countershaft 21 for relative rotation therewith and meshes with the third speed driving gear 26. The fourth speed gear GA4 includes a fourth speed driving gear 28 that is coupled with the second main shaft 20 so as not to rotate relative thereto and a fourth speed driven gear 29 that is supported by the countershaft 21 for relative rotation therewith and meshes with the fourth speed driving gear 28.

The fifth speed gear GA5 includes a fifth speed driving gear 30 that is supported by the first main shaft 19 for relative rotation therewith and a fifth speed driven gear 31 that is coupled with the countershaft 21 so as not to rotate relative thereto and meshes with the fifth speed driving gear 30. The sixth speed gear GA6 includes a sixth speed driving gear 32 that is supported by the second main shaft 20 for relative rotation therewith and a sixth speed driven gear 33 that is coupled with the countershaft 21 so as not to rotate relative thereto and meshes with the sixth speed driving gear 32.

A first shifter 35 is coupled with the first main shaft 19 so as not to rotate relative thereto, but to move in the axial direction thereof. The first shifter 35 can move between a position where the first shifter 35 engages with the fifth speed driving gear 30 to establish the fifth speed gear GA5 and a position where the first shifter 35 disengages from the fifth speed driving gear 30. The third speed driving gear 26, which continuously meshes with the third speed driven gear 27, is integrally formed with the first shifter 35.

A second shifter 36 is coupled with the second main shaft 20 so as not to rotate relative thereto, but to move in the axial direction thereof. The second shifter 36 can move between a position where the second shifter 36 engages with the sixth speed driving gear 32 to establish the sixth speed gear GA6 and a position where the second shifter 36 disengages from the sixth speed driving gear 32. The fourth speed driving gear 28, which continuously meshes with the fourth speed driven gear 29, is integrally formed with the second shifter 36.

Furthermore, third and fourth shifters 37, 38 are coupled with the countershaft 21 so as not to rotate relative thereto, but to move in the axial direction thereof. The third shifter 37 can move to a position where the third shifter 37 meshes with the first speed driven gear 23 to establish the first speed gear GA1, a position where the third shifter 37 engages with the third speed driven gear 27 to establish the third speed gear GA3 and a neutral position where the third shifter 37 engages with neither the first speed driven gear 23 nor the third speed driven gear 27. The fifth speed driven gear 31, which continuously meshes with the fifth speed driving gear 30, is integrally formed with the third shifter 37.

The fourth shifter 38 can move to a position where the fourth shifter 38 engages with the second speed driven gear 25 to establish the second speed gear GA2, a position where the fourth shifter 38 engages with the fourth speed driven gear 29 to establish the fourth speed gear GA4, and a neutral position where the fourth shifter 38 engages with neither the second speed driven gear 25 nor the fourth speed driven gear 29. The sixth speed driven gear 33, which continuously meshes with the sixth speed driving gear 32, is integrally formed with the fourth shifter 38.

Returning to FIG. 1, a shift drum 39 is rotatably supported by the crankcase 12 such that axis thereof parallel to the first main shaft 19, the second main shaft 20 and the countershaft 21. A first shift fork 40 embracing the first shifter 35, a second shift fork 41 embracing the second shifter 36, a third shift fork 42 embracing the third shifter 37, and a fourth shift fork 43 embracing the fourth shifter 38 are engaged with the circumference of the shift drum 39 in order to drive the first to fourth shifters 35 to 38 in the axial directions of the first main shaft 19, the second main shaft 20 and the countershaft 21 in accordance with the rotation of the shift drum 39.

The first main shaft 19, the second main shaft 20 and the shift drum 39 are arranged so that the center distance L1 between the first main shaft 19 and the shift drum 39 becomes equal to the center distance L2 between the second main shaft 20 and the shift drum 39.

The first main shaft 19, the second main shaft 20 and the countershaft 21 are arranged so that the line LL connecting the first main shaft 19, the second main shaft 20 and the countershaft 21 inclines downwardly and rearwardly on a projection view of a plane orthogonal to the axes of the first main shaft 19, the second main shaft 20 and the countershaft 21. The shift drum 39 is placed lower than the line LL and more forward than the second main shaft 20.

Returning again to FIG. 2, provided to the crankshaft 18 is a single driving gear 46 making up a part of a primary reduction gear mechanism 45 for transmitting rotary power from the crankshaft 18 to the first and second main shafts 19, 20. First and second clutches 47A, 48A transmitting/interrupting the rotary power from the primary reduction gear mechanism 45 to the first and second main shafts 19, 20 are disposed at ends of the first and second main shafts 19, 20, respectively.

The first clutch 47A includes a first clutch outer 49 that is supported at an end of the first main shaft 19 for relative rotation therewith, multiple first friction plates 50, 50 . . . that are engaged with the first clutch outer 49, a first clutch inner 51 that is coupled with the first main shaft 19 so as not to rotate relative thereto, multiple second friction plates 52, 52 . . . that are arranged alternately with the first friction plates 50, 50 . . . and engaged with the first clutch inner 51, a first pressure receiving plate 53 that is integrally provided to the first clutch inner 51 and faces the axially outermost friction plate among the alternately arranged first and second friction plates 50, 50 . . . and 52, 52 . . . , a dish-like first pressing member 54 whose outer edge faces the axially innermost friction plate among the alternately arranged first and second friction plates 50, 50 . . . and 52, 52 . . . , a first retainer 56 that is movable in the direction parallel to the first main shaft 19 and fastened by bolts 55 . . . on the top ends of multiple cylindrical coupling portions 54a . . . whose base ends are integrally connected with the first pressing member 54, a first clutch spring 57 that is interposed between the first clutch inner 51 and first retainer 56 so as to bias the first pressing member 54 toward the side where the first and second friction plates 50, 50 . . . and 52, 52 . . . , which are disposed between the first pressure receiving plate 53 and first pressing member 54, are pressed tightly to each other, and a first lifter 59 that is coupled at the inner radius of the first retainer 56 with a first release bearing 58. An actuator (not shown) is drivingly connected and coupled to the first lifter 59 so as to drive the first lifter 59 in an axial direction.

When the actuator is not in operation, the first pressing member 54 is biased by the first clutch spring 57 toward the engagement position and therefore the first clutch 47A is in a power transmission state. Upon starting the actuator to actuate the first lifter 59 in the axial direction, the driving force is transmitted from the first release bearing 58 to the first retainer 56 that in turn compresses the first clutch spring 57 while pressing the first pressing member 54 toward the side where the pressing force applied to the first and second friction plates 50, 52 . . . is weakened, thereby interrupting the power transmission between the first clutch outer 49 and first clutch inner 51.

The second clutch 48A includes a second clutch outer 61 that is supported at an end of the second main shaft 20 for relative rotation therewith, multiple third friction plates 62, 62 . . . that are engaged with the second clutch outer 61, a second clutch inner 63 that is coupled with the second main shaft 20 so as not to rotate relative thereto, multiple fourth friction plates 64, 64 . . . that are arranged alternately with the third friction plates 62, 62 . . . and engaged with the second clutch inner 63, a second pressure receiving plate 65 that is integrally provided to the second clutch inner 63 and faces the axially outermost friction plate among the alternately arranged third and fourth friction plates 62, 62 . . . and 64, 64 . . . , a dish-like second pressing member 66 whose outer edge faces the axially innermost friction plate among the alternately arranged third and fourth friction plates 62, 62 . . . and 64, 64 . . . , a second retainer 68 that is movable in the direction parallel to the first main shaft 19 and fastened by bolts 67 . . . on the top ends of multiple cylindrical coupling portions 66a . . . whose base ends are integrally connected with the second pressing member 66, a second clutch spring 69 that is interposed between the second clutch inner 63 and second retainer 68 so as to bias the second pressing member 66 toward the side where the third and fourth friction plates 62, 62 . . . and 64, 64 . . . , which are disposed between the second pressure receiving plate 65 and second pressing member 66, are pressed tightly to each other, and a second lifter 71 that is coupled at the inner radius of the second retainer 68 with a second release bearing 70. An actuator (not shown) is drivingly connected and coupled to the second lifter 71 so as to drive the second lifter 71 in the axial direction.

Such a second clutch 48A also operates in the same manner as the above-described first clutch 47A. The second clutch 48A can transmit power when the actuator is not in operation, and the power transmission between the second clutch outer 61 and second clutch inner 63 is interrupted when the actuator is in operation.

The rotary power is transmitted from the crankshaft 18 to the first and second main shafts 19, 20 via the primary reduction gear mechanism 45. The primary reduction gear mechanism 45 includes a single driving gear 46 provided on the crankshaft 18, a first driven gear 73 supported adjacent to the first clutch 47A by the first main shaft 19 for relative rotation therewith and meshing with the driving gear 46, an intermediate driving gear 74 rotating with the first driven gear 73, an idle gear 75 meshing with the intermediate driving gear 74 and supported by the countershaft 21 for relative rotation therewith, and a second driven gear 76 supported by the second main shaft 20 for relative rotation therewith and meshing with the idle gear 75.

The first driven gear 73 is coupled to the first clutch outer 49, which is an input member of the first clutch 47A interposed between the first driven gear 73 and first main shaft 19, with an elastic member or first damping rubber 77 interposed therebetween, while the second driven gear 76 is coupled to the second clutch outer 61, which is an input member of the second clutch 48A interposed between the second driven gear 76 and second main shaft 20, so as not to rotate relative thereto. The first driven gear 73 and intermediate driving gear 74 are integrally formed as a one-piece structure.

The first driven gear 73 is arranged so as to overlap with a part of the idle gear 75 as viewed in the axial direction of the first main shaft 19, while arranged so as to overlap with a part of the second clutch 48A as viewed along a line connecting the axes of the first and second main shafts 19, 20.

In addition, the first and second clutches 47A, 48A are disposed at ends of the first and second main shafts 19, 20, respectively, so as to overlap with each other by at least a part (a large part in this embodiment) of the first and second clutches 47A, 48A as viewed along a line connecting the axes of the first and second main shafts 19, 20. The idle gear 75 is arranged so as to overlap with a part of the first and second clutches 47A, 48A as viewed along the axis of the countershaft 21.

Furthermore, the countershaft 21 is rotatably supported by the crankcase 12 so that an end of the countershaft 21 is positioned axially more inward than the ends of the first and second main shafts 19, 20. The first driven gear 73 is disposed between the idle gear 75 provided on the end of the countershaft 21 and the first and second clutches 47A, 48A.

Next, the effect of the first embodiment will be described. The primary reduction gear mechanism 45 for transmitting the rotary power from the crankshaft 18 to the first and second main shafts 19, 20 includes: the single driving gear 46 mounted on the crankshaft 18; the first driven gear 73 supported by the first main shaft 19 for relative rotation therewith at a position adjacent to the first clutch 47A and meshing with the driving gear 46; the intermediate driving gear 74 rotating with the first driven gear 73; the idle gear 75 meshing with the intermediate driving gear 74; and the second driven gear 76 supported by the second main shaft 20 for relative rotation therewith and meshing with the idle gear 75.

Since the first clutch 47A is disposed between the first driven gear 73 and first main shaft 19 and the second clutch 48A is disposed between the second driven gear 76 and second main shaft 20, the first driven gear 73 and intermediate driving gear 74 rotate with the rotation of the driving gear 46, and the rotary power of the intermediate driving gear 74 is transmitted to the second driven gear 76 via the idle gear 75, thereby smoothly transmitting the rotary power from the crankshaft 18 to the first and second main shafts 19, 20.

In addition, supporting the idle gear 75 by the countershaft 21 for relative rotation therewith eliminates the necessity of an additional shaft for the idle gear 75, and in turn an increase in the number of components and the necessity of a space for the additional shaft are eliminated, thereby preventing the power unit P from upsizing.

Further, integrally forming the first driven gear 73 and intermediate driving gear 74 can further reduce the number of components.

In addition, the arrangement of the first driven gear 73 so as to overlap with a part of the idle gear 75 as viewed in the axial direction of the first main shaft 19 allows a reduction in diameter of the intermediate driving gear 74 and second driven gear 76 and therefore a reduction in relative center distance among the first main shaft 19, countershaft 21 and second main shaft 20, thereby downsizing the power unit P.

Furthermore, the arrangement of the first driven gear 73 so as to overlap with a part of the second clutch 48A as viewed along a line connecting the axes of the first and second main shafts 19, 20 can make the shaft length of the second main shaft 20 shorter in comparison with the case where the second clutch 48A on the second main shaft 20 is disposed axially more outward than the first driven gear 73, thereby downsizing the power unit P.

In addition, providing the first and second clutches 47A, 48A on ends of the first and second main shafts 19, 20 so that at least a part of the first and second clutches 47A, 48A overlap with each other as viewed along a line connecting the axes of the first and second main shafts 19, 20 can prevent the power unit P from upsizing in the axial direction in comparison with the case where the first and second clutches 47A, 48A are displaced from each other in the axial direction. Also, the idle gear 75 partially overlapping with the first and second clutches 47A, 48A as viewed along the axis of the countershaft 21 allows a reduction in center distance among the first main shaft 19, countershaft 21 and second main shaft 20, thereby downsizing the power unit P.

Since the countershaft 21 is rotatably supported by the crankcase 12 so that the end of the countershaft 21 is positioned more inward than the ends of the first and second main shafts 19, 20, and the first driven gear 73 is disposed between the idle gear 75 on the end of the countershaft 21 and the first and second clutches 47A, 48A, the first driven gear 73 can be placed near the idle gear 75 in the axial direction and therefore the power transmission structure from the crankshaft 18 to the first and second main shafts 19, 20 can be made compact. Positioning the end of the countershaft 21 axially more inward than the ends of the first and second main shafts 19, 20 allows effective use of the space between the idle gear 75 and first clutch 47A for the first driven gear 73, thereby downsizing the power unit P.

The first damping rubber 77 interposed between the first driven gear 73 and the first clutch outer 49 of the first clutch 47A can cushion the shock, which is derived from the rotary power transmitted from the crankshaft 18, on the first and second main shafts 19, 20, thereby reducing the number of components and alleviating the shock from the crankshaft 18 onto the first and second main shafts 19, 20.

The arrangement of the first main shaft 19, the second main shaft 20 and the shift drum 39 so that the center distance L1 between the first main shaft 19 and shift drum 39 becomes equal to the center distance L2 between the second main shaft 20 and shift drum 39 allows the first shift fork 40 between the shift drum 39 and first main shaft 19 and the second shift fork 41 between the shift drum 39 and second main shaft 20 to be equal, thereby improving productivity.

Furthermore, since the first main shaft 19, the second main shaft 20 and the countershaft 21 are arranged so that the line LL connecting the axes of the first main shaft 19, second main shaft 20 and countershaft 21 inclines downwardly and rearwardly on the projection view of a plane orthogonal to the axes of the first main shaft 19, second main shaft 20 and countershaft 21, while the shift drum 39 is arranged lower than the line LL and more forward than the second main shaft 20, the engine's center of gravity can be lowered and the space in front of the second main shaft 20 can be effectively used for the shift drum 39, thereby improving the space-use efficiency.

Figure 3:
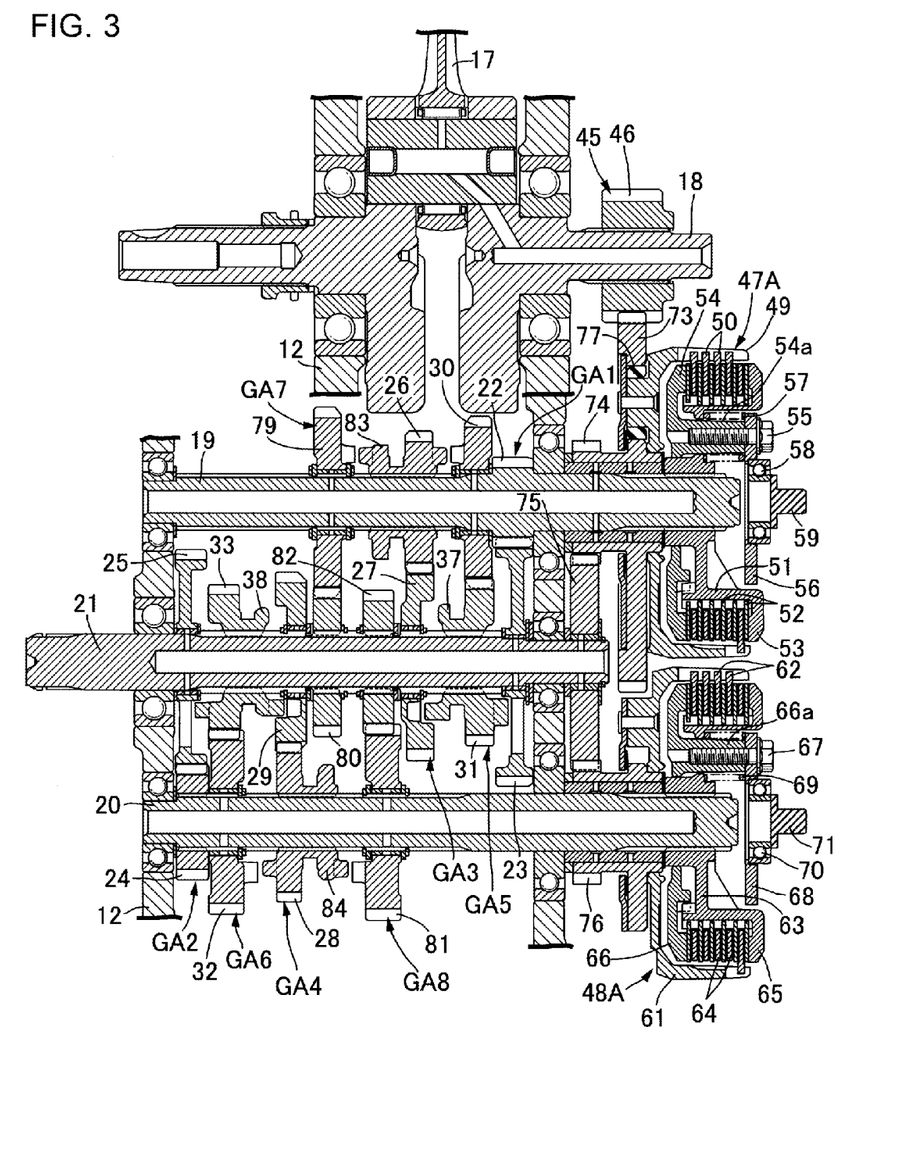
FIG. 3 is a cross-sectional view of a power unit according to a second illustrative embodiment, corresponding to FIG. 2.

The second embodiment of the present invention will be described with reference to FIG. 3. Like components are denoted by like numerals as of the first embodiment and will not be further explained.

Multispeed gears to be selectively established are provided among the first main shaft 19, the second main shaft 20 and the countershaft 21. In the second embodiment, first, third, fifth and seventh speed gears GA1, GA3, GA5, GA7 are provided between the first main shaft 19 and countershaft 21 and can be alternatively established; while second, fourth, sixth and eighth speed gears GA2, GA4, GA6, GA8 are provided between the second main shaft 20 and the countershaft 21 and can be alternatively established.

The first speed gear GA1 includes a first speed driving gear 22 that is integrally formed with the first main shaft 19 and a first speed driven gear 23 that is supported by the countershaft 21 for relative rotation therewith and meshes with the first speed driving gear 22. The second speed gear GA2 includes a second speed driving gear 24 that is coupled with the second main shaft 20 so as not to rotate relative thereto and a second speed driven gear 25 that is supported by the countershaft 21 for relative rotation therewith and meshes with the second speed driving gear 24.

The third speed gear GA3 includes a third speed driving gear 26 that is coupled with the first main shaft 19 so as not to rotate relative thereto and a third speed driven gear 27 that is supported by the countershaft 21 for relative rotation therewith and meshes with the third speed driving gear 26. The fourth speed gear GA4 includes a fourth speed driving gear 28 that is coupled with the second main shaft 20 so as not to rotate relative thereto and a fourth speed driven gear 29 that is supported by the countershaft 21 for relative rotation therewith and meshes with the fourth speed driving gear 28.

The fifth speed gear GA5 includes a fifth speed driving gear 30 that is supported by the first main shaft 19 for relative rotation therewith and a fifth speed driven gear 31 that is coupled with the countershaft 21 so as not to rotate relative thereto and meshes with the fifth speed driving gear 30. The sixth speed gear GA6 includes a sixth speed driving gear 32 that is supported by the second main shaft 20 for relative rotation therewith and a sixth speed driven gear 33 that is coupled with the countershaft 21 so as not to rotate relative thereto and meshes with the sixth speed driving gear 32.

The seventh speed gear GA7 includes a seventh speed driving gear 79 that is supported by the first main shaft 19 for relative rotation therewith and a seventh speed driven gear 80 that is coupled with the countershaft 21 so as not to rotate relative thereto and meshes with the seventh speed driving gear 79. The eighth speed gear GA8 includes an eighth speed driving gear 81 that is supported by the second main shaft 20 for relative rotation therewith and an eighth speed driven gear 82 that is coupled with the countershaft 21 so as not to rotate relative thereto and meshes with the eighth speed driving gear 81.

A first shifter 83 is coupled with the first main shaft 19 so as not to rotate relative thereto, but to move in the axial direction thereof. The first shifter 83 can move to a position where the first shifter 83 engages with the fifth speed driving gear 30 to establish the fifth speed gear GA5, a position where the first shifter 83 engages with the seventh speed driving gear 79 to establish the seventh speed gear GA7, and a neutral position where the first shifter 83 engages with neither the fifth speed driving gear 30 nor the seventh speed driving gear 79. The third speed driving gear 26, which continuously meshes with the third speed driven gear 27, is integrally formed with the first shifter 83.

A second shifter 84 is coupled with the second main shaft 20 so as not to rotate relative thereto, but to move in the axial direction thereof. The second shifter 84 can move to a position where the second shifter 84 engages with the sixth speed driving gear 32 to establish the sixth speed gear GA6, a position where the second shifter 84 engages with the eighth speed driving gear 81 to establish the eighth speed gear GA8 and a neutral position where the second shifter 84 engages with neither the sixth speed driving gear 32 nor the eighth speed driving gear 81. The fourth speed driving gear 28, which continuously meshes with the fourth speed driven gear 29, is integrally formed with the second shifter 84.

Furthermore, third and fourth shifters 37, 38, as with the first embodiment, are coupled with the countershaft 21 so as not to rotate relative thereto, but to move in the axial direction thereof.

The third shifter 37 can move to a position where the third shifter 37 meshes with the first speed driven gear 23 to establish the first speed gear GA1, a position where the third shifter 37 engages with the third speed driven gear 27 to establish the third speed gear GA3 and a neutral position where the third shifter 37 engages with neither the first speed driven gear 23 nor the third speed driven gear 27. The fifth speed driven gear 31, which continuously meshes with the fifth speed driving gear 30, is integrally formed with the third shifter 37.

The fourth shifter 38 can move to a position where the fourth shifter 38 engages with the second speed driven gear 25 to establish the second speed gear GA2, a position where the fourth shifter 38 engages with the fourth speed driven gear 29 to establish the fourth speed gear GA4 and a neutral position where the fourth shifter 38 engages with neither the second speed driven gear 25 nor the fourth speed driven gear 29. The sixth speed driven gear 33, which continuously meshes with the sixth speed driving gear 32, is integrally formed with the fourth shifter 38.

Rotary power is transmitted from the crankshaft 18 to the first and second main shafts 19, via a primary reduction gear mechanism 45 used to convey power. A driving gear 46, first driven gear 73, intermediate driving gear 74, idle gear 75 and second driven gear 76, which make up the primary reduction gear mechanism 45, are arranged in the same manner as those in the first embodiment.

The second embodiment also can offer the same effect as the first embodiment.

Figure 4:
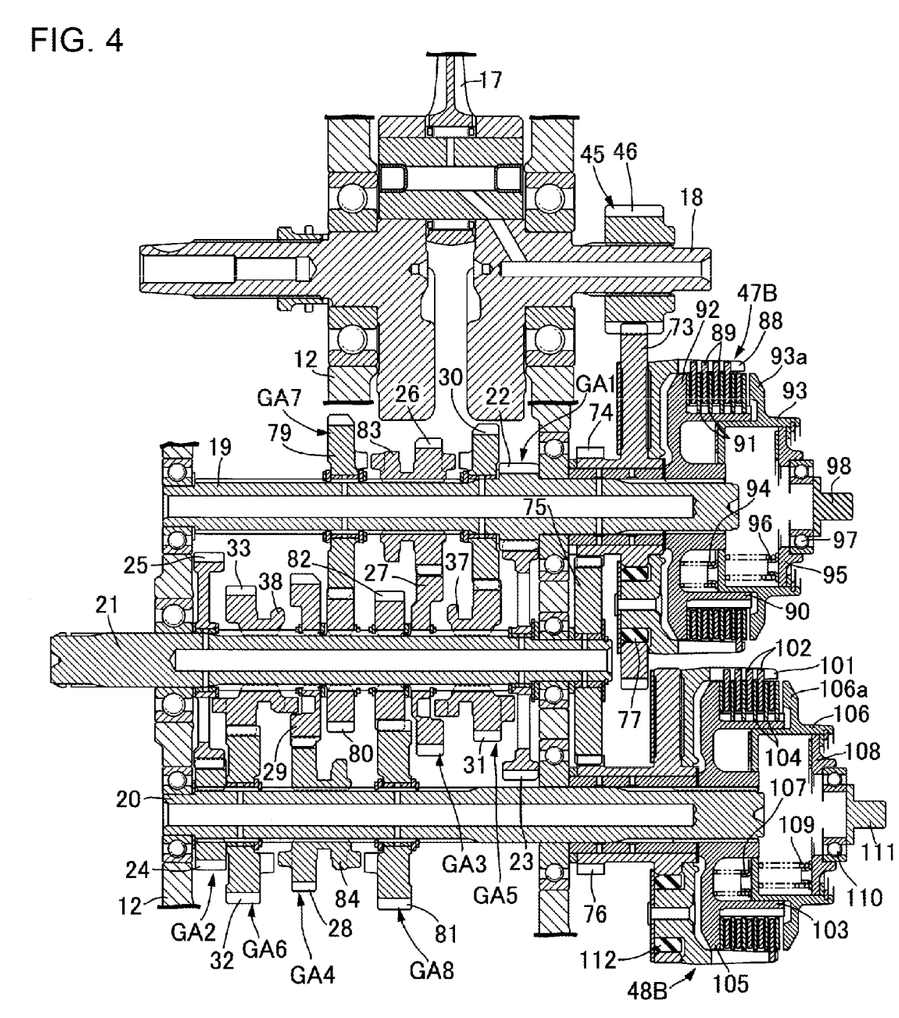
FIG. 4 is a cross-sectional view of a power unit according a third illustrative embodiment, corresponding to FIG. 2.

The third embodiment of the present invention will be described with reference to FIG. 4. Like components are denoted by like numerals as of the first and second embodiments and shown in FIG. 4, but will not be further explained.

First, third, fifth and seventh speed gears GA1, GA3, GA5, GA7 to be alternatively established, as with the case of the second embodiment, are provided between the first main shaft 19 and the countershaft 21. Second, fourth, sixth and eighth speed gears GA2, GA4, GA6, GA8 to be alternatively established, as with the case of the second embodiment, are provided between the second main shaft 20 and countershaft 21.

A first shifter 83 is coupled with the first main shaft 19 so as not to rotate relative thereto, but to move in the axial direction thereof. The first shifter 83 can move to a position where the fifth speed gear GA5 is established, a position where the seventh speed gear GA7 is established and a neutral position where neither the fifth speed gear GA5 nor the seventh speed gear GA7 is established.

A second shifter 84 is coupled with the second main shaft 20 so as not to rotate relative thereto, but to move in the axial direction thereof. The second shifter 84 can move to a position where the sixth speed gear GA6 is established, a position where the eighth speed gear GA8 is established and a neutral position where neither the sixth speed gear GA6 nor the eighth speed gear GA8 is established.

Third and fourth shifters 37, 38 are coupled with the countershaft 21 so as not to rotate relative thereto, but to move in the axial direction thereof.

As with the case of the first and second embodiments, the third shifter 37 can move to a position where the first speed gear GA1 is established, a position where the third speed gear GA3 is established and a neutral position where neither the first speed gear GA1 nor the third speed gear GA3 is established, while the fourth shifter 38 can move to a position where the second speed gear GA2 is established, a position where the fourth speed gear GA4 is established and a neutral position where neither the second speed gear GA2 nor the fourth speed gear GA4 is established.

First and second clutches 47B, 48B are provided at ends of the first and second main shafts 19, 20, respectively. The first and second clutches 47B, 48B transmit/interrupt the rotary power to be transmitted to the first and second main shafts 19, 20 by a primary reduction gear mechanism 45, which is used to transmit the rotary power from the crankshaft 18 to the first and second main shafts 19, 20.

The first clutch 47B includes a first clutch outer 88 that is supported by the first main shaft 19 for relative rotation therewith, multiple first friction plates 89, 89 . . . that are engaged with the first clutch outer 88, a first clutch inner 90 that is coupled with the first main shaft 19 so as not to rotate relative thereto, multiple second friction plates 91, 91 . . . that are arranged alternately with the first friction plates 89, 89 . . . and engaged with the first clutch inner 90, a first pressure receiving plate 92 that is integrally provided to the first clutch inner 90 and faces the axially innermost friction plate among the alternately arranged first and second friction plates 89, 89 . . . and 91, 91 . . . , a first pressing member 93 that is shaped into a cylinder with a bottom so as to slidably fit in the first clutch inner 90 in a relative manner and includes a first pressing portion 93a integrally formed therewith so as to project radially outward and face the axially outermost friction plate among the alternately arranged first and second friction plates 89, 89 . . . and 91, 91 . . . , a first disengaging spring 94 that is interposed between the first clutch inner 90 and first pressing member 93 so as to bias the first pressing member 93 toward the side where the first pressing portion 93a moves away from the first pressure receiving plate 92, a disk-like first transmitting member 95 that is coaxially inserted in the first pressing member 93 so as not to fall off from the first pressing member 93, a first push spring 96 that is disposed between the first pressing member 93 and first transmitting member 95 so as to exert its spring force on the first transmitting member 95 to bias it against the end on the open side of the first pressing member 93, and a first lifter 98 that is coaxially arranged with the first transmitting member 95 and coupled with the first transmitting member 95 with a first release bearing 97 therebetween. The first lifter 98 is driven in the axial direction by an actuator, which is not shown in FIG. 4.

When the actuator is not in operation, the first pressing member 93 is biased by the first disengaging spring 94 toward the disengagement position and therefore the first clutch 47B is in an interruption state, or interrupts power transmission.

Upon starting the actuator to actuate the first lifter 98 in the axial direction, the driving force is transmitted from the first release bearing 97 through the first transmitting member 95 and first push spring 96 to the first pressing member 93 that in turn compresses the first disengaging spring 94 while pressing the first and second friction plates 89, 89 . . . and 91, 91 . . . toward the first pressure receiving plate 92 so that the first and second friction plates 89, 89 . . . and 91, 91 . . . frictionally engage each other, resulting in the first clutch outer 88 and first clutch inner 90 being connected to each other.

The first push spring 96 is then compressed with the movement of the first lifter 98 in the axial direction. When the spring force of the first push spring 96 exceeds the spring force of the first disengaging spring 94, the first pressing member 93 is driven by the thrust corresponding to the amount of compression of the first push spring 96 to exert a clutch pressing force on the first and second friction plates 89, 89 . . . and 91, 91 . . . , thereby bringing the first clutch 47B into a connection state with a clutch capacity corresponding to the clutch pressing force. In short, a linear relationship can be established between the position of the first lifter 98 and the torque transmission capacity of the first clutch 47B, and controlling the operation of the actuator enables highly accurate control of the torque transmission capacity of the first clutch 47B.

The rotary power from the crankshaft 18 is transmitted to the first main shaft 19 via the primary reduction gear mechanism 45 and first clutch 47B. The first driven gear 73 of the primary reduction gear mechanism 45 is coupled to the first clutch outer 88 of the first clutch 47B with the first damping rubber 77 therebetween.

The second clutch 48B includes a second clutch outer 101 that is supported by the second main shaft 20 for relative rotation therewith, multiple third friction plates 102, 102 . . . that are engaged with the second clutch outer 101, a second clutch inner 103 that is coupled with the second main shaft 20 so as not to rotate relative thereto, multiple fourth friction plates 104, 104 . . . that are arranged alternately with the third friction plates 102, 102 . . . and engaged with the second clutch inner 103, a second pressure receiving plate 105 that is integrally provided to the second clutch inner 103 and faces the axially innermost friction plate among the alternately arranged third and fourth friction plates 102, 102 . . . and 104, 104 . . . , a second pressing member 106 that is shaped into a cylinder with a bottom so as to slidably fit in the second clutch inner 103 in a relative manner and includes a second pressing portion 106a integrally formed therewith so as to project radially outward and face the axially outermost friction plate among the alternately arranged third and fourth friction plates 102, 102 . . . and 104, 104 . . . , a second disengaging spring 107 that is interposed between the second clutch inner 103 and second pressing member 106 so as to bias the second pressing member 106 toward the side where the second pressing portion 106a moves away from the second pressure receiving plate 105, a disk-like second transmitting member 108 that is coaxially inserted in the second pressing member 106 so as not to fall off from the second pressing member 106, a second push spring 109 that is interposed between the second pressing member 106 and second transmitting member 108 so as to exert its spring force on the second transmitting member 108 to bias it against the end on the open side of the second pressing member 106, and a second lifter 111 that is coaxially arranged with the second transmitting member 108 and coupled with the second transmitting member 108 with a second release bearing 110 therebetween. The second lifter 111 is driven in the axial direction by an actuator, which is not shown in FIG. 4.

Such a second clutch 48B, which performs transmission/interruption operations as with the case of the first clutch 47B, can establish a linear relationship between the position of the second lifter 111 and the torque transmission capacity of the second clutch 48B and enables highly accurate control of the torque transmission capacity of the second clutch 48B with the controlled actuator.

The rotary power from the crankshaft 18 is transmitted to the second main shaft 20 via the primary reduction gear mechanism 45 and second clutch 48B. The second driven gear 76 of the primary reduction gear mechanism 45 is coupled to the second clutch outer 101 of the second clutch 48B with a second damping rubber 112, which is an elastic member, therebetween.

In addition, a driving gear 46, first driven gear 73, intermediate driving gear 74, idle gear 75 and second driven gear 76, which make up the primary reduction gear mechanism 45, are arranged in the same manner as the first and second embodiments except for that the second clutch 48B is displaced from the first driven gear 73 in the axial direction.

The axial displacement of the second clutch 48B from the first driven gear 73 makes the second main shaft 20 longer than that of the first and second embodiments, but otherwise the third embodiment can offer the same effect as the first and second embodiments.

In addition, since the first damping rubber 77 is interposed between the first driven gear 73 of the primary reduction gear mechanism 45 and the first clutch outer 88 of the first clutch 47B and the second damping rubber 112 is interposed between the second driven gear 76 of the primary reduction gear mechanism 45 and the second clutch outer 101 of the second clutch 48B, the damping effect provided by the second damping rubber 112, in addition to the damping effect provided by the first damping rubber 77, can more reliably alleviate the shock on the second main shaft 20 side.

Figure 5:
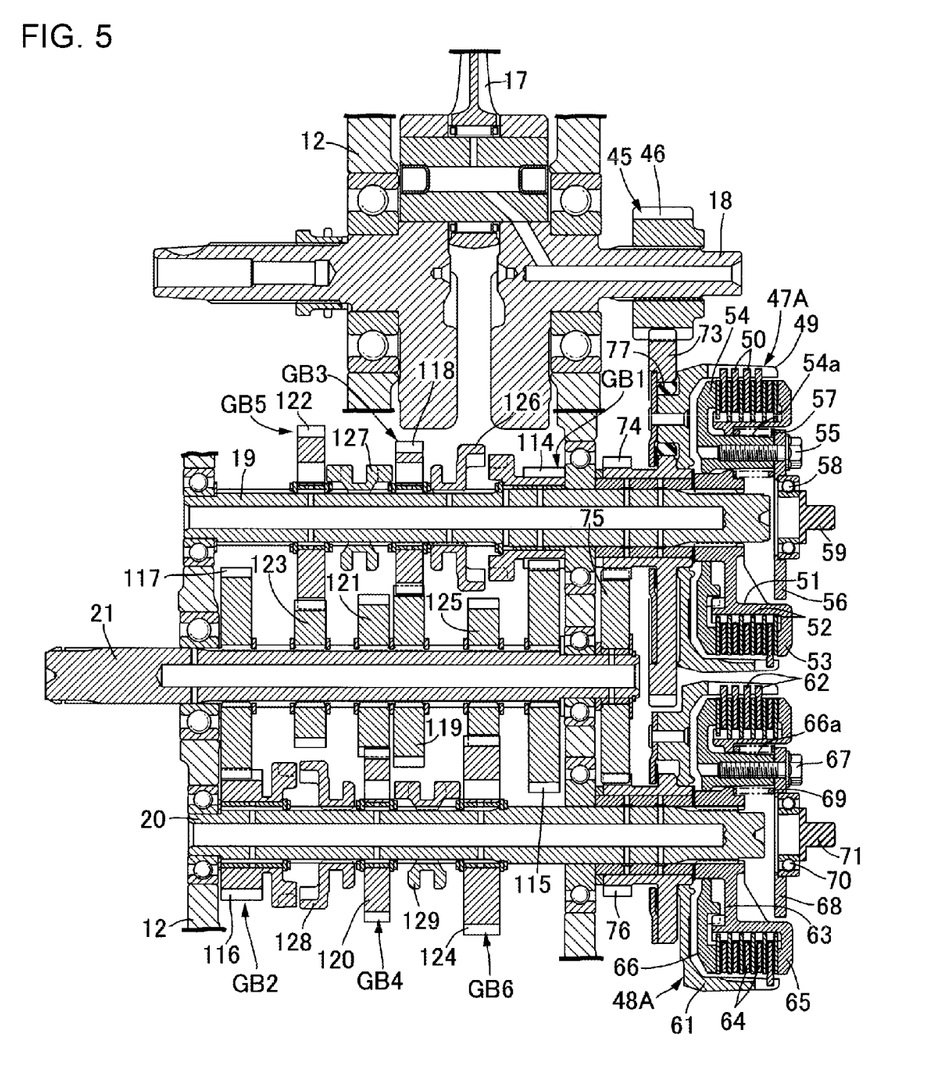
FIG. 5 is a cross-sectional view of a power unit according to a fourth illustrative embodiment, corresponding to FIG. 2.

The fourth embodiment of the present invention will be described with reference to FIG. 5. Like components are denoted by like numerals as of the first to third embodiments and shown in FIG. 5, but will not be further explained.

First, third and fifth speed gears GB1, GB3, GB5 to be alternatively established are provided between the first main shaft 19 and the countershaft 21. Second, fourth and sixth speed gears GB2, GB4, GB6 to be alternatively established are provided between the second main shaft 20 and countershaft 21.

The first speed gear GB1 includes a first speed driving gear 114 that is supported by the first main shaft 19 for relative rotation therewith and a first speed driven gear 115 that is coupled with the countershaft 21 so as not to rotate relative thereto and meshes with the first speed driving gear 114.

The second speed gear GB2 includes a second speed driving gear 116 that is supported by the second main shaft 20 for relative rotation therewith and a second speed driven gear 117 that is coupled with the countershaft 21 so as not to rotate relative thereto and meshes with the second speed driving gear 116.

The third speed gear GB3 includes a third speed driving gear 118 that is supported by the first main shaft 19 for relative rotation therewith and a third speed driven gear 119 that is coupled with the countershaft 21 so as not to rotate relative thereto and meshes with the third speed driving gear 118.

The fourth speed gear GB4 includes a fourth speed driving gear 120 that is supported by the second main shaft 20 for relative rotation therewith and a fourth speed driven gear 121 that is coupled with the countershaft 21 so as not to rotate relative thereto and meshes with the fourth speed driving gear 120.

The fifth speed gear GB5 includes a fifth speed driving gear 122 that is supported by the first main shaft 19 for relative rotation therewith and a fifth speed driven gear 123 that is coupled with the countershaft 21 so as not to rotate relative thereto and meshes with the fifth speed driving gear 122.

The sixth speed gear GB6 includes a sixth speed driving gear 124 that is supported by the second main shaft 20 for relative rotation therewith and a sixth speed driven gear 125 that is coupled with the countershaft 21 so as not to rotate relative thereto and meshes with the sixth speed driving gear 124.

Shifters 126 and 127 are coupled with the first main shaft 19 so as not to rotate relative thereto, but to move in the axial direction thereof. The shifter 126 can move between a position where the shifter 126 engages with the first speed driving gear 114 to establish the first speed gear GB1 and a position where the shifter 126 disengages from the first speed driving gear 114. The shifter 127 can move to a position where the shifter 127 engages with the third speed driving gear 118 to establish the third speed gear GB3, a position where the shifter 127 engages with the fifth speed driving gear 122 to establish the fifth speed gear GB5 and a neutral position where the shifter 127 engages with neither the third speed driving gear 118 nor the fifth speed driving gear 122.

In addition, shifters 128 and 129 are coupled with the second main shaft 20 so as not to rotate relative thereto, but to move in the axial direction thereof. The shifter 128 can move between a position where the shifter 128 engages with the second speed driving gear 116 to establish the second speed gear GB2 and a position where the shifter 128 disengages from the second speed driving gear 116. The shifter 129 can move to a position where the shifter 129 engages with the fourth speed driving gear 120 to establish the fourth speed gear GB4, a position where the shifter 129 engages with the sixth speed driving gear 124 to establish the sixth speed gear GB6 and a neutral position where the shifter 129 engages with neither the fourth speed driving gear 120 nor the sixth speed driving gear 124.

Rotary power is transmitted from the crankshaft 18 to the first and second main shafts 19, via a primary reduction gear mechanism 45. The rotary power from the primary reduction gear mechanism 45 to the first and second main shafts 19, 20 is transmitted/interrupted by first and second clutches 47A, 48A that are disposed at ends of the first and second main shafts 19, 20, respectively.

A driving gear 46, first driven gear 73, intermediate driving gear 74, idle gear 75 and second driven gear 76, which make up the primary reduction gear mechanism 45, are arranged in the same manner as the first embodiment. The first driven gear 73 is coupled with the first clutch outer 49 of the first clutch 47A with a first damping rubber 77 therebetween.

The fourth embodiment also offers the same effect as the first embodiment.

Figure 6:
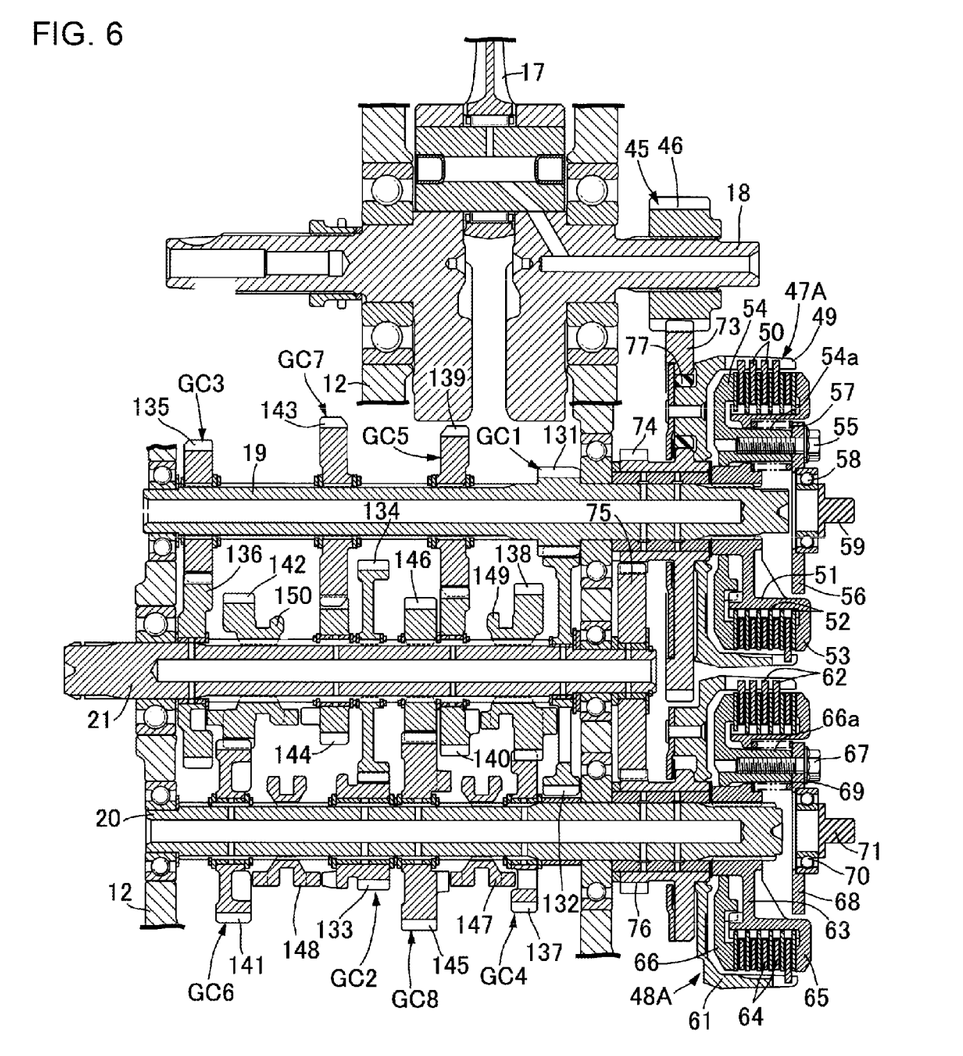
FIG. 6 is a cross-sectional view of a power unit according to a fifth illustrative embodiment, corresponding to FIG. 2.

The fifth embodiment of the present invention will be described with reference to FIG. 6. Like components are denoted by like numerals as of the first to fourth embodiments and shown in FIG. 5, but will not be further explained.

First, third, fifth and seventh speed gears GC1, GC3, GC5, GC7 to be alternatively established are provided between the first main shaft 19 and the countershaft 21. Second, fourth, sixth and eighth speed gears GC2, GC4, GC6, GC8 to be alternatively established are provided between the second main shaft 20 and countershaft 21.

The first speed gear GC1 includes a first speed driving gear 131 that is integrally formed with the first main shaft 19 and a first speed driven gear 132 that is supported by the countershaft 21 for relative rotation therewith and meshes with the first speed driving gear 131. The second speed gear GC2 includes a second speed driving gear 133 that is supported by the second main shaft 20 for relative rotation therewith and a second speed driven gear 134 that is coupled with the countershaft 21 so as not to rotate relative thereto and meshes with the second speed driving gear 133.

The third speed gear GC3 includes a third speed driving gear 135 that is coupled with the first main shaft 19 so as not to rotate relative thereto and a third speed driven gear 136 that is supported by the countershaft 21 for relative rotation therewith and meshes with the third speed driving gear 135. The fourth speed gear GC4 includes a fourth speed driving gear 137 that is supported by the second main shaft 20 for relative rotation therewith and a fourth speed driven gear 138 that is coupled with the countershaft 21 so as not to rotate relative thereto and meshes with the fourth speed driving gear 137.

The fifth speed gear GC5 includes a fifth speed driving gear 139 that is coupled with the first main shaft 19 so as not to rotate relative thereto and a fifth speed driven gear 140 that is supported by the countershaft 21 for relative rotation therewith and meshes with the fifth speed driving gear 139. The sixth speed gear GC6 includes a sixth speed driving gear 141 that is supported by the second main shaft 20 for relative rotation therewith and a sixth speed driven gear 142 that is coupled with the countershaft 21 so as not to rotate relative thereto and meshes with the sixth speed driving gear 141.

The seventh speed gear GC7 includes a seventh speed driving gear 143 that is coupled with the first main shaft 19 so as not to rotate relative thereto and a seventh speed driven gear 144 that is supported by the countershaft 21 for relative rotation therewith and meshes with the seventh speed driving gear 143. The eighth speed gear GC8 includes an eighth speed driving gear 145 that is supported by the second main shaft 20 for relative rotation therewith and an eighth speed driven gear 146 that is coupled with the countershaft 21 so as not to rotate relative thereto and meshes with the eighth speed driving gear 145.

A pair of shifters 147, 148 is coupled with the second main shaft 20 so as not to rotate relative thereto, but to move in the axial direction thereof. The shifter 147 can move to a position where the shifter 147 engages with the fourth speed driving gear 137 to establish the fourth speed gear GC4, a position where the shifter 147 engages with the eighth speed driving gear 145 to establish the eighth speed gear GC8 and a neutral position where the shifter 147 engages with neither the fourth speed driving gear 137 nor the eighth speed driving gear 145. The shifter 148 can move to a position where the shifter 148 engages with the second speed driving gear 133 to establish the second speed gear GC2, a position where the shifter 148 engages with the sixth speed driving gear 141 to establish the sixth speed gear GC6 and a neutral position where the shifter 148 engages with neither the second speed driving gear 133 nor the sixth speed driving gear 141.

A shifter 149 integrally formed with the fourth speed driven gear 138 and a shifter 150 integrally formed with the sixth speed driven gear 142 are coupled with the countershaft 21 so as not to rotate relative thereto, but to move in the axial direction thereof. The shifter 149 integrally formed with the fourth speed driven gear 138 can move to a position where the shifter 149 engages with the first speed driven gear 132 to establish the first speed gear GC1, a position where the shifter 149 engages with the fifth speed driven gear 140 to establish the fifth speed gear GC5 and a neutral position where the shifter 149 engages with neither the first speed driven gear 132 nor the fifth speed driven gear 140.

The shifter 150 integrally formed with the sixth speed driven gear 142 can move to a position where the shifter 150 engages with the third speed driven gear 136 to establish the third speed gear GC3, a position where the shifter 150 engages with the seventh speed driven gear 144 to establish the seventh speed gear GC7 and a neutral position where the shifter 150 engages with neither the third speed driven gear 136 nor the seventh speed driven gear 144.

A driving gear 46, first driven gear 73, intermediate driving gear 74, idle gear 75 and second driven gear 76, which make up a primary reduction gear mechanism 45, are arranged in the same manner as the first embodiment. The first driven gear 73 is coupled with the first clutch outer 49 of the first clutch 47A with a first damping rubber 77 therebetween.

The fifth embodiment also can offer the same effect as the first embodiment.

The foregoing has described the embodiments of the present invention; however, the invention should not be limited to the illustrated embodiments. It should be appreciated that various modifications can be made to the illustrated embodiments within the scope of the invention as set forth in the appended claims.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A power unit for a vehicle, said power unit comprising:
a crankcase;
a crankshaft disposed in the crankcase;
a first main shaft, a second main shaft and a single countershaft that are rotatably supported by said crankcase with their axes being parallel to each other;
a plurality of multispeed gears that are selectively established and provided among the first main shaft, the second main shaft and the countershaft;
a primary reduction gear mechanism;
a single driving gear that makes up a part of said primary reduction gear used to transmit rotary power from the crankshaft to the first and second main shafts, said single driving gear being provided on the crankshaft; and
first and second clutches that are operable to selectively transmit or interrupt a transfer of rotary power from the primary reduction gear mechanism to the first and second main shafts, said first and second clutches disposed at ends of the first and second main shafts, respectively,
wherein the primary reduction gear mechanism comprises:
the driving gear;
a first driven gear that is supported by the first main shaft for relative rotation therewith at a position adjacent to the first clutch, and that meshes with the single driving gear;
an intermediate driving gear arranged to rotate with the first driven gear;
an idle gear that meshes with the intermediate driving gear and that is supported by the countershaft for relative rotation therewith; and
a second driven gear that is supported by the second main shaft for relative rotation therewith, and that meshes with the idle gear,
wherein the first clutch is provided between the first driven gear and first main shaft, and
wherein the second clutch is provided between the second driven gear and the second main shaft.

2. The power unit for a vehicle according to claim 1, wherein the first driven gear and the intermediate driving gear are integrally formed as a one-piece member.

3. The power unit for a vehicle according to claim 1, wherein the first driven gear is disposed so as to overlap with a part of the idle gear, as viewed in an axial direction of the first main shaft.

4. The power unit for a vehicle according to claim 1, wherein the first driven gear is disposed so as to overlap with a part of the second clutch, as viewed along a line connecting axes of the first and second main shafts.

5. The power unit for a vehicle according to claim 1, wherein the first and second clutches are disposed at ends of the first and second main shafts so that at least parts of the first and second clutches overlap with each other, as viewed along a line connecting the axes of the first and second main shafts, and wherein the idle gear is disposed so as to overlap with a part of the first and second clutches, as viewed along the axis of the countershaft.

6. The power unit for a vehicle according to claim 1, wherein the countershaft is rotatably supported by the crankcase, with one end of the countershaft positioned more axially inward than ends of the first and second main shafts, and wherein the first driven gear is disposed between the idle gear on the end of the countershaft and the first and second clutches.

7. The power unit for a vehicle according to claim 1, further comprising a first elastic member interposed between the first driven gear and an input member of the first clutch.

8. The power unit for a vehicle according to claim 7, further comprising a second elastic member, which is different from the first elastic member, interposed between the second driven gear and an input member of the second clutch.

9. The power unit for a vehicle according to claim 1, further comprising a shift drum rotatably supported by the crankcase;
wherein the first main shaft, the second main shaft and the shift drum are respectively arranged so that a center distance between the first main shaft and the shift drum is substantially equal to a center distance between the second main shaft and the shift drum.

10. The power unit for a vehicle according to claim 1, wherein the first main shaft, the second main shaft and the countershaft are arranged so that a line connecting axes of the first main shaft, the second main shaft and the countershaft inclines downwardly and rearwardly on a projection view of a plane orthogonal to the axes of the first main shaft, the second main shaft and the countershaft, and wherein the shift drum is arranged lower than said line connecting axes of the first main shaft, the second main shaft and the countershaft, and more forward than the second main shaft.

11. A power unit for a vehicle, said power unit comprising:
a crankcase;
a crankshaft disposed in the crankcase;
a first main shaft, a second main shaft and a countershaft that are rotatably supported by said crankcase with their axes being parallel to each other;
a plurality of multispeed gears that are selectively established and provided among the first main shaft, the second main shaft and the countershaft;
a primary reduction gear mechanism comprising a single driving gear arranged on said crankshaft, and operable to transmit rotary power from the crankshaft to the first and second main shafts; and
first and second clutches that are operable to selectively transmit or interrupt a transfer of rotary power from the primary reduction gear mechanism to the first and second main shafts, said first and second clutches disposed at ends of the first and second main shafts, respectively,
wherein the primary reduction gear mechanism further comprises:
a first driven gear that is supported by the first main shaft for relative rotation therewith at a position adjacent to the first clutch, and that meshes with the driving gear;
an intermediate driving gear integrally formed with said first driven gear so as rotate therewith;
an idle gear that meshes with the intermediate driving gear, and that is supported by the countershaft for relative rotation therewith; and
a second driven gear that is supported by the second main shaft for relative rotation therewith, and that meshes with the idle gear,
wherein the first clutch is arranged between the first driven gear and first main shaft, and
wherein the second clutch is arranged between the second driven gear and the second main shaft.

12. The power unit for a vehicle according to claim 11, wherein the first driven gear is arranged so as to overlap with at least a portion of the idle gear, as viewed in an axial direction of the first main shaft.

13. The power unit for a vehicle according to claim 11, wherein the first driven gear is arranged so as to overlap with a portion of the second clutch, as viewed along a line connecting axes of the first and second main shafts.

14. The power unit for a vehicle according to claim 11, wherein the first and second clutches are arranged at ends of the first and second main shafts so that at least end portions of the first and second clutches overlap with each other, as viewed along a line connecting the axes of the first and second main shafts; and wherein the idle gear is arranged so as to overlap with a portion of the first and second clutches, as viewed along an axis of the countershaft.

15. The power unit for a vehicle according to claim 11, further comprising:
a first elastic member interposed between the first driven gear and an input member of the first clutch; and
a second elastic member interposed between the second driven gear and an input member of the second clutch.

16. A power unit for a motorcycle, said power unit comprising
a crankcase;
a crankshaft disposed in the crankcase;
a first main shaft, a second main shaft and a countershaft that are rotatably supported by said crankcase with their axes being parallel to each other;
a plurality of multispeed gears that are selectively established and provided among the first main shaft, the second main shaft and the single countershaft;
a primary reduction gear mechanism comprising:
a driving gear arranged on the crankshaft; said driving gear being operable to transmit rotary power from the crankshaft to the first and second main shafts; and
a first driven gear that is supported by the first main shaft for relative rotation therewith at a position adjacent to the first clutch, and that meshes with the driving gear;
an intermediate driving gear integrally formed with said first driven gear as a one-piece structure;
an idle gear that meshes with the intermediate driving gear, and that is supported by the countershaft for relative rotation therewith; and
a second driven gear that is supported by the second main shaft for relative rotation therewith, and that meshes with the idle gear; and
first and second clutches that are operable to selectively transmit or interrupt a transfer of rotary power from the primary reduction gear mechanism to the first and second main shafts, said first and second clutches being disposed at ends of the first and second main shafts, respectively,
wherein the first clutch is provided between the first driven gear and first main shaft, and
wherein the second clutch is provided between the second driven gear and the second main shaft.

17. The power unit for a vehicle according to claim 16, wherein the first driven gear is arranged so as to overlap with at least a portion of the idle gear as viewed in an axial direction of the first main shaft.

18. The power unit for a vehicle according to claim 16, wherein the first driven gear is arranged so as to overlap with a portion of the second clutch as viewed along a line connecting axes of the first and second main shafts.

19. The power unit for a vehicle according to claim 16, further comprising:
a first elastic member interposed between the first driven gear and an input member of the first clutch; and
a second elastic member interposed between the second driven gear and an input member of the second clutch;
wherein the first and second clutches are arranged at ends of the first and second main shafts so that at least end portions of the first and second clutches overlap with each other, as viewed along a line connecting the axes of the first and second main shafts.

20. The power unit for a vehicle according to claim 16, wherein the first main shaft, the second main shaft and the countershaft are arranged so that a line connecting axes of the first main shaft, the second main shaft and the countershaft inclines downwardly and rearwardly on a projection view of a plane orthogonal to the axes of the first main shaft, the second main shaft and the countershaft,
wherein the shift drum is arranged lower than said line connecting axes of the first main shaft, the second main shaft and the countershaft and more forward than the second main shaft; and
wherein one end of the countershaft positioned more axially inward than ends of the first and second main shafts, and the first driven gear is disposed between the idle gear on the end of the countershaft and the first and second clutches.

* * * * *